United States Patent [19]

Huessy

[11] 3,895,121

[45] July 15, 1975

[54] PROCESSING OF WHEAT GERM TO RETARD RANCIDIFICATION

[75] Inventor: Eric G. Huessy, Eden Prairie, Minn.

[73] Assignee: Peavey Company, Minneapolis, Minn.

[22] Filed: Dec. 10, 1973

[21] Appl. No.: 422,982

[52] U.S. Cl. .............. 426/465; 426/148; 426/208; 426/375; 426/448; 426/473; 426/518; 426/466
[51] Int. Cl. ............................................. A23b 1/04
[58] Field of Search .......... 426/208, 375, 142, 145, 426/147, 148, 312, 465

[56] References Cited
UNITED STATES PATENTS

| | | | |
|---|---|---|---|
| 2,085,421 | 6/1937 | Donk et al. ........................ | 426/208 |
| 2,357,312 | 9/1944 | Cryns ................................. | 426/208 |
| 2,725,300 | 11/1955 | Cryns ................................. | 426/148 |
| 3,036,919 | 5/1962 | Kretschmer et al. ............... | 426/465 |
| 3,783,164 | 1/1974 | Galle ................................... | 426/312 |

*Primary Examiner*—Raymond N. Jones

[57] ABSTRACT

The stabilization of wheat germ by conversion into a stable, palatable food product through combined operations of mechanical homogenization and subsequent heat treatment. The raw wheat germ is initially homogenized and plasticized by confined exposure to elevated temperatures and pressures while being extruded into a cohesive sheet or ribbon. Thereafter, the extrudate is preferably crushed to reduce the particle size and thereafter is subjected to a dry heat treating operation wherein the temperature is raised to the range of about 400° F., which modifies surface oils and moisture, with the surface residue encapsulating certain components in the matrix so as to sharply retard rancidification.

12 Claims, 3 Drawing Figures

---

```
┌─────────────────────────────────────────────────────────────────┐
│ HOMOGENIZE AND PLASTICIZE WHEAT GERM WITH HEAT AND PRESSURE     │
└─────────────────────────────────────────────────────────────────┘
                              │
                              ▼
┌─────────────────────────────────────────────────────────────────┐
│ EXTRUDE HOMOGENIZED WHEAT GERM INTO COHESIVE RIBBON             │
└─────────────────────────────────────────────────────────────────┘
                              │
                              ▼
┌─────────────────────────────────────────────────────────────────┐
│ MECHANICALLY CRUSH RIBBON INTO PARTICULATE SOLIDS               │
└─────────────────────────────────────────────────────────────────┘
                              │
                              ▼
        ┌────────────────────────────────────────┐
        │ HEAT - TREAT EXTRUDATE AT 350° F       │
        └────────────────────────────────────────┘
```

PROCESSING OF WHEAT GERM TO RETARD RANCIDIFICATION

BACKGROUND OF THE INVENTION

The present invention relates generally to a method of stabilizing wheat germ by conversion of the natural product into a nutritious, stable and palatable food product, and more specifically to a method which employs a series of operations to convert the wheat germ into products having an extremely slow rate of rancidification. In addition, the present invention is concerned with the stabilized wheat germ product prepared as a result of the process.

Wheat germ is a natural-occurring substance having substantial vitamin and nutritional value. The natural-occurring material contains significant quantities of tocopherols, which are known for their antioxidant properties as well as their Vitamin E activity. However, natural or normal wheat germ is unstable under normal ambient conditions, and deteriorates relatively rapidly into a rancid and impalatable product generally unfit for human consumption. Because of the significant vitamin and nutritional values of the product, efforts have been undertaken in the past to develop techniques for stabilizing the wheat germ and render it palatable for human consumption under normal storage conditions. These techniques have been only of limited value inasmuch as the product treated by these techniques has relatively modest shelf life. For example, shelf life for most presently available treated wheat germ products has typically been on the order of a few months.

In accordance with the present invention, a technique has been developed which produces a stable wheat germ product, wherein the product is in either flake, flour, crumbles, or ribbon form, and wherein the palatability of the product is retained over extended periods of time. The rate of rancidification is extremely low, and wheat germ treated in accordance with the present invention provides a product with a shelf life in excess of one year under normal ambient conditions.

SUMMARY OF THE INVENTION

Briefly, in accordance with the present invention, normal or natural wheat germ is initially placed within a confined treating zone wherein the temperature and pressure are increased under conditions of controlled mixing to the extent that the wheat germ is homogenized and plasticized. The homogenized and plasticized wheat germ is then released from the confined treating zone by passage through an extrusion orifice so as to form a cohesive ribbon or the like, the ribbon having a relatively thin cross-sectional dimension such as, for example, one-sixteenth to three thirty-second inch or the like. The cohesive ribbon, as extruded, is permitted to cool, and thereby form a mechanically sound, durable mass. This cool ribbon is then preferably mechanically crushed into smaller fragments, or into particulate solids of any desired size. These particulate solids are subsequently exposed to a heat-treat operation wherein they are exposed to a temperature in the area of about 400° F. for a period of, for example, 2 to 4 minutes.

While the precise mechanism is not entirely understood, it appears that the treatment of the material within the barrel portion of the extruder accomplishes an homogenization and ultimate stabilization of the product. It appears that the natural-occurring tocopherols surface, and their natural antioxidant properties provide for preferential oxidation of the tocopherols prior to oxidation of the oil. Natural-occurring wheat germ contains significant quantities of highly unsaturated fatty acids, and in the presence of the surfaced tocopherols, it does appear that these oils are dispersed, encapsulated, and otherwise held in a stable mass in the matrix. At least a partial enzyme inactivation also appears to occur due to the presence of heat and pressure within the confined enclosure of the extruder barrel. It will be noted, however, that the as-extruded material possesses reasonable resistance toward rancidity, oxidative rancidity may occur over extended periods of exposure to ambient, and hence the subsequent heat treating operation is employed.

Following the extrusion operation, and prior to the establishing of any significant degree of rancidification, the extrudate is preferably mechanically crushed and thereafter heat treated at a substantially elevated temperature, such as in the range of about 400° F., wherein at least a portion of the oils present in the product are further stabilized. This treatment of the extrudate appears to encapsulate the oil retained in the product which is, in turn, believed to be one of the contributing factors to the extended shelf life available with the product thus treated.

Therefore, it is a primary object of the present invention to provide a stabilization treatment for natural-occurring wheat germ to produce an improved wheat germ product which is mechanically sound and stable, and which has an unusually extended shelf life.

It is yet a further object of the present invention to provide an improved wheat germ product which is prepared by an initial homogenization and plasticization of the natural wheat germ in a substantially confined and enclosed chamber, this being followed by an extrusion of this material into a cohesive ribbon, with the ribbon product thereafter being heat treated at a substantially elevated temperature so as to stabilize the finished product.

It is yet a further object of the present invention to provide an improved wheat germ product which has an extended shelf life, and which is treated so as to achieve this shelf life with the combination of an initial homogenization and plasticization of the wheat germ as in the driving input to an extruder, this being followed by extrusion of the homogenized and plasticized material, with the extrudate ultimately being heat treated to further stabilize the product.

Other and further objects of the present invention will become apparent to those skilled in the art upon a study of the following specification, appended claims, and accompanying drawing.

DESCRIPTION OF THE PREFERRED EMBODIMENT

In accordance with the preferred modification of the present invention, natural wheat germ material is initially placed within a chamber and subjected to an elevated temperature and pressure in order to achieve homogenization and plasticization of the wheat germ material. Typically, homogenization and plasticization may be achieved with the natural wheat germ material being subjected to a temperature within the range of between about 200°–295° F. and under a pressure ranging from between about 1000–29,000 psi while in a confined enclosure. Under most conditions, particularly when the material is being agitated, homogenized and plasticization may occur in a period of time ranging from between about 10–30 seconds.

Figure 1:
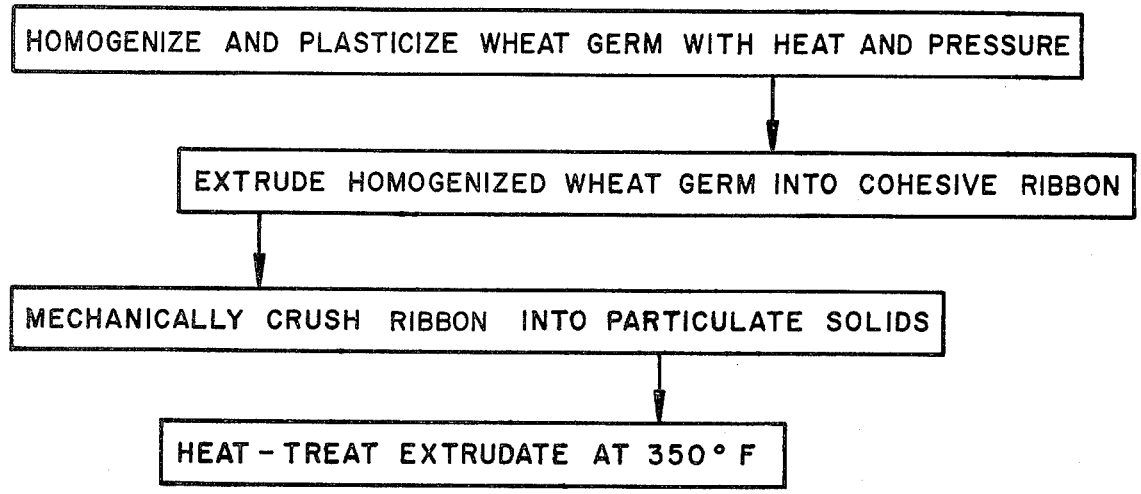
FIG. 1 is a flow diagram illustrating a preferred sequence of steps undertaken in connection with the improved process of the present invention.
Figure 2:
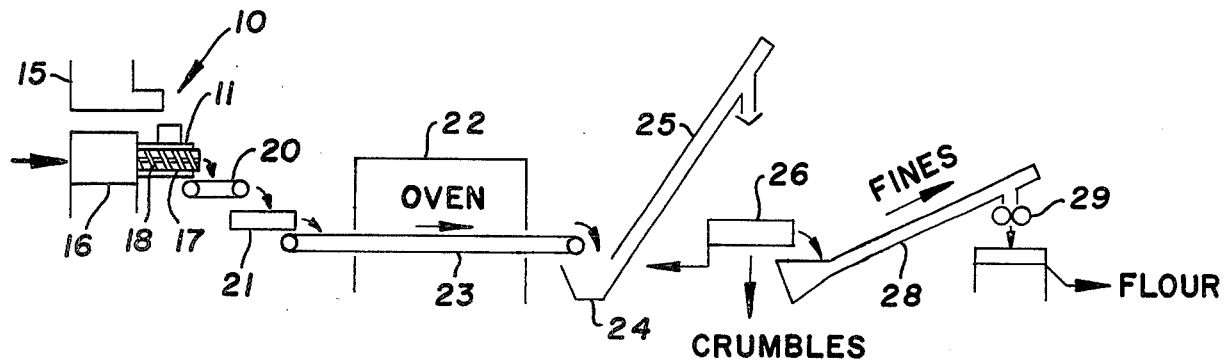
FIG. 2 is a schematic diagram illustrating one of the series of operations which may be employed in connection with the present invention.

In a production system, the natural wheat germ material may be placed within the auger chamber of an extruder, with the outlet from the chamber being an extrusion orifice. In FIG. 2, for example, homogenization and plasticization of the wheat germ material will occur in the auger chamber shown generally at 10, with the auger barrel 11 being provided with an annular jacket so as to receive heated fluid, or the like, in the event the temperature range which is required to achieve homogenization and plasticization cannot be obtained solely by the mechanical pressures involved.

Following the mechanical treatment, and in the event extrusion is undertaken, the extrudate is then preferably passed through a mechanical crusher, such as a hammermill as shown at 21, wherein the material is divided into particulate solids prior to the subsequent heat treatment. In lieu of a hammermill, the heat treated material may be passed through a mechanical crusher such as a roller mill or the like in order to provide these particulate solids. Thereafter, the material is passed through a confined heat treating zone wherein the temperature is elevated to a range of approximately 300° to 425° F., and wherein the particulate extrudate is exposed to this temperature for a period of, for example, 30 minutes. Specifically, a temperature of 325° F. for a period of 30 minutes is preferred, while an elevated temperature in the range of from 250°–500° F. for periods ranging from 2 minutes to 60 minutes may be found useful. It will be appreciated that the shorter treatment periods are utilized for these higher temperatures, while the more extensive periods are utilized for the lower temperature treatment. During this portion of the process, the chamber is opened to atmosphere in order to permit removal of excessive quantities of retained moisture, or other volatile components.

With regard to the system illustrated in FIG. 2 of the drawing, wheat germ material is retained in a hopper shown at 15, and is controllably fed into the extruder chamber 16, as illustrated therebelow. A vibratory feeder such as a Syntron feeder may be employed to deliver natural or normal wheat germ from the hopper 15 into the chamber 16. Within chamber 16, there is an inlet to the auger barrel 17, and auger 18 is arranged therewithin. The auger and the barrel are conventional components, commercially available, and normally provide a fit of about one-sixteenth inch between the auger periphery and the inner chamber periphery, with the auger having a diameter of 4 inches, a length of 1¼ feet, a variable pitch of 5 inches at inlet, 1½ inches at discharge. The flight depth at inlet is 1⅝ inches, at discharge 1⅜ inches.

The orifice of the extruder is rectangular, and under these conditions, it has a dimension of 1½ inches by one-fourth inch. With the auger rotating at 300 rpm, wheat germ is extruded outwardly, when homogenized and plasticized, at a rate of about 600 inches per minutes, and is received on the surface of conveyor 20. Conveyor 20 discharges the extrudate into hammermill 21, which reduces the particle size of the material into particulate solids. Preferably, the material will have approximately 60 percent of the discharge from the mill with a size sufficient to pass through a No. 6 sieve, while retained on a No. 12 sieve. This material is then passed through heated enclosure 22 which is preferably a microwave oven, however a conventional band oven may be employed for this purpose. The dimensions of the oven are such that the rate of extrusion, the extrudate remains within the confines of the oven for a period ranging from between 2 and 4 minutes, and preferably approximately 3 minutes. The oven is maintained at a temperature of 325° F., which is sufficient to treat the wheat germ oil and cause partial evaporation and, it is believed, at least partial encapsulation. As has been indicated hereinabove, this treatment appears to toast the finely divided extrudate, while reducing the moisture content therein. This treatment, which may also be referred to as "toasting" inactivates certain of the enzymes, particularly upon exposure of the toasted material to air. The highly unsaturated fatty acids which are present in the extrudate, when toasted, appear to form membrane barriers or films which contain effective quantities of tocopherols. This toasting also reduces or substantially eliminates hydrolytic rancidity in the finished product. Upon being discharged from the confines of oven 22, conveyor 20 drops the heat treated or flash-treated extrudate into bin 24, whereupon the material is moved by elevator 25 and ultimately deposited into classifier 26. The discharge from classifier 26 is divided, with the flakes or crumbles of the desired size being retained; with the over-sized particles being reground, and with the fines being passed onto a second elevator or conveyor 28. Elevator 28 passes the particles into roller mill 29, whereupon the material is crushed into the form of a flour or other powdered substance. Typically, 60 percent of the product is retained as crumbles having a size range from between about No. 6 sieve and No. 12 sieve, with approximately 10 percent being considered fines, and with the balance of 30 percent being over-size particles.

As an alternative, it is possible to take the discharge from hammermill 21 and return fines or undesired size particles through extruder 10, this method being utilized when large-size particles, such as flakes or crumbles are desired.

As a further alternative, the discharge from the mill 21 may be taken directly to a buffer storage area and retained until the quantity is required. Thereafter, the material may be passed through an oven or other heat treating enclosure to obtain the product as desired.

Figure 3:
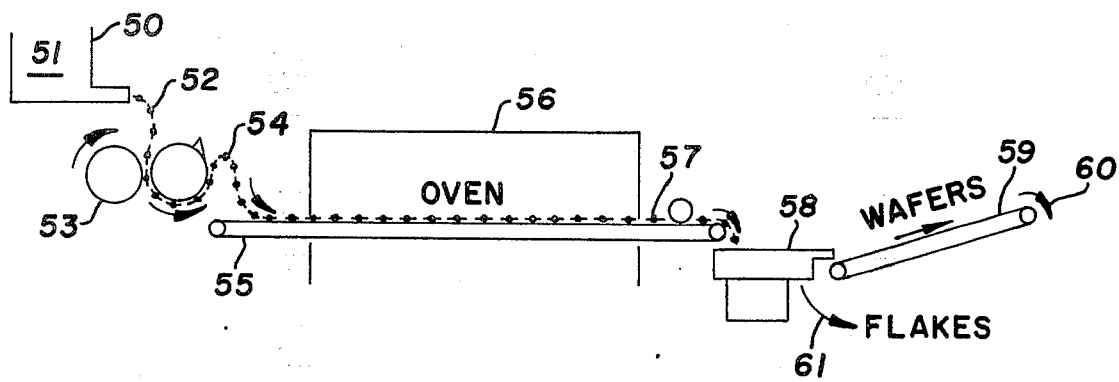
FIG. 3 is a schematic diagram illustrating an alternate of series of operations which may be employed in connection with the present invention.

Attention is now directed to FIG. 3 wherein an alternate structure is illustrated for performing the process. A Syntron controlled feeder 50 is provided which has a hopper zone 51 for receiving normal or natural wheat germ, the discharge from hopper 51 being shown at 52, and falling within the bite zone of a pair of opposed sheet rolls 53. The band of material then is discharged from the sheet rolls at the doctor blade as illustrated at 54, and onto conveyor 55 for movement through microwave or band oven 56. Upon discharge from oven 56, the material, as shown at 57, is discharged into screen or sifter 58 and the over-size material is discharged as a wafer or the like onto conveyor or elevator 59, being ultimately discharged as at 60, whereas the under-sized material is discharged as a flake or the like as at 61. Under certain operating parameters, it may be desirable to interpose a crusher such as hammermill, roller mill, or the like between the discharge from sheet rolls 53 and the entrance to oven 56. Such an operation is not, however, required.

Under certain conditions, it may be desirable to provide a source of thermal energy or heat for the rolls 53. Under heated conditions, it is, of course, preferred that the rolls be heated so as to expose the material passing therebetween to temperatures in the range of about 250°–295° F. for exposure time of from 20 to 30 seconds. Such overall exposure times or average exposure times are, of course, achieved under standard operating conditions.

It will be appreciated, therefore, that the technique of the present invention, depending upon the mechanical components utilized, can prepare wheat germ having extremely stable shelf life and storage characteristics in the form of either flour, crumbles, wheat germ flakes, or as continuous sheets or wafers.

The process employs a homogenization and plasticization technique which utilizes low heat and high pressure in a confined enclosure, with low moisture content wheat germ being employed. Normal or natural wheat germ contains approximately from 11 to 14 percent moisture, depending upon ambient, all of which is capable of homogenization and plasticization under modest temperature and pressure conditions. This homogenized material, when extruded, compresses into a cohesive ribbon or the like, and thus provides a tight, uniform matrix which is ultimately passed through a second heat treating zone wherein the wheat germ oil is partially modified, and accordingly an encapsulating layer or stabilizing film is formed about the surface of the residual oil.

It would seem, therefore, that the individual cells of natural wheat germ oil are ruptured and the oil present is then more widely, finely, and uniformly dispersed and integrated through the cohesive matrix. The extrusion technique appears to at least surface dry the matrix, and the oil appears to have a lower rate of oxidation. A more extensive shelf stability and shelf life is provided with the nutritional qualities remaining intact.

Moisture content is normally a factor in treating food products of this type, and as has been indicated, normal wheat germ, stored at normal ambient conditions will contain from between about 11 to 14 percent water. Upon being passed through the flaking rolls as indicated in FIG. 3, or through the extruder as indicated in FIG. 2, the moisture content will drop to about 10 percent. Upon completion of the overall process, however, the moisture content will normally return to the normal or natural level of between about 11 to 14 percent.

I claim:

1. The method of stabilizing wheat germ which comprises the steps of:
   a. exposing natural wheat germ to a first treating zone maintained at an elevated temperature in the range of from 200° to 295° F. and at an elevated pressure in excess of about 1000 psi until said wheat germ becomes plasticized;
   b. subjecting said plasticized wheat germ material to a high pressure, within the range of from 1000 to 29,000 psi and extruding said plasticized material through an orifice to form a generally cohesive extrudate;
   c. exposing said extrudate to a second treating zone prior to rancidification, wherein the temperature is maintained at a level of between about 300°–425° F., and retaining said extrudate within said second treating zone for a period of from between about 2 minutes and 30 minutes.

2. The method as set forth in claim 1 wherein said treating zone of elevated pressure is the infeed chamber of an extruder.

3. The method as set forth in claim 1 wherein said natural wheat germ in said first treating zone is exposed to said elevated temperature for a residence period of from 10 seconds to 30 seconds.

4. The method as set forth in claim 3 wherein said residence period is approximately 30 seconds.

5. The method as set forth in claim 1 wherein the exposure of said extrudate in said second treating zone occurs at a temperature of approximately 400° F.

6. The method as set forth in claim 5 wherein said extrudate is maintained at said temperature for a period of approximately 3 minutes.

7. The method as set forth in claim 1 wherein said cohesive extrudate is a ribbon having a thickness of approximately 3/32 inch.

8. The method as set forth in claim 1 wherein said extrudate is cooled to substantially room temperature prior to exposure to said second treating zone.

9. The method as set forth in claim 1 wherein treatment in said second treating zone is conducted in a toasting oven having a vent open to atmosphere.

10. The method as set forth in claim 1 wherein said extrudate is subjected to crushing mechanical forces sufficient to form particulate material.

11. The emthod as set forth in claim 1 wherein a third treating zone is provided in the form of a roller mill wherein said extrudate passes through a bite zone and is converted into particulate solids.

12. The method as set forth in claim 1 wherein said natural wheat germ contains between about 11 percent to 14 percent moisture.

* * * * *